(12) United States Patent
Kim et al.

(10) Patent No.: US 10,672,052 B2
(45) Date of Patent: Jun. 2, 2020

(54) METHOD, APPARATUS, SYSTEM, AND COMPUTER PROGRAM FOR OFFERING AND DISPLAYING PRODUCT INFORMATION

(71) Applicant: ODD CONCEPTS INC., Seoul (KR)

(72) Inventors: Jung Tae Kim, Seoul (KR); Jin Myeong Ahn, Seoul (KR); Kyung Mo Koo, Busan (KR)

(73) Assignee: ODD CONCEPTS INC., Seoul (KR)

( * ) Notice: Subject to any disclaimer, the term of this patent is extended or adjusted under 35 U.S.C. 154(b) by 337 days.

(21) Appl. No.: 15/415,779

(22) Filed: Jan. 25, 2017

(65) Prior Publication Data

US 2017/0132686 A1 May 11, 2017

Related U.S. Application Data

(63) Continuation of application No. PCT/KR2015/007805, filed on Jul. 27, 2015.

(30) Foreign Application Priority Data

Jul. 25, 2014 (KR) .................. 10-2014-0094531

(51) Int. Cl.
*G06Q 30/00* (2012.01)
*G06Q 30/06* (2012.01)
(Continued)

(52) U.S. Cl.
CPC ........ *G06Q 30/0625* (2013.01); *G06F 16/00* (2019.01); *G06F 16/51* (2019.01);
(Continued)

(58) Field of Classification Search
USPC ....................................... 705/26.1
See application file for complete search history.

(56) References Cited

U.S. PATENT DOCUMENTS

| 9,720,934 B1* | 8/2017 | Dube ............... G06F 16/583 |
| 2015/0049902 A1* | 2/2015 | Moraleda ......... G06K 9/00624 |
| | | 382/103 |

(Continued)

FOREIGN PATENT DOCUMENTS

| KR | 10-2006-0122791 A | 11/2006 |
| KR | 10-2010-0027722 A | 3/2010 |

(Continued)

OTHER PUBLICATIONS

International Search Report for International Patent Application No. PCT/KR2015/007805 filed on Jul. 27, 2015.

*Primary Examiner* — Mila Airapetian

(57) ABSTRACT

The present invention relates to a method, an apparatus, a system, and a computer program in which a server offers product information corresponding to an image displayed on a client and the client displays the product information. A method for offering product information by a server to a client includes: generating a database on a plurality of products and extracting feature information on an image included in the database; receiving an image displayed on the client as a query image from the client; determining a matching product matched to feature information on the query image by retrieving feature information on the image in the database; and offering information on the matching product to the client. According to the present invention, the server may retrieve a database of product information only with an image displayed on the client and may offer product information to the client.

10 Claims, 9 Drawing Sheets

(51) Int. Cl.
*G06F 16/583* (2019.01)
*G06K 9/00* (2006.01)
*G06K 9/46* (2006.01)
*G06K 9/62* (2006.01)
*G06F 16/51* (2019.01)
*G06F 16/00* (2019.01)
*H04L 29/06* (2006.01)
*G06F 3/0481* (2013.01)
*G06F 3/0482* (2013.01)

(52) U.S. Cl.
CPC ....... *G06F 16/583* (2019.01); *G06K 9/00671* (2013.01); *G06K 9/4647* (2013.01); *G06K 9/4671* (2013.01); *G06K 9/6202* (2013.01); *G06K 9/628* (2013.01); *G06K 9/6211* (2013.01); *G06K 9/6215* (2013.01); *G06Q 30/06* (2013.01); *G06Q 30/0631* (2013.01); *G06Q 30/0643* (2013.01); *H04L 67/42* (2013.01); *G06F 3/0482* (2013.01); *G06F 3/04817* (2013.01)

(56) References Cited

U.S. PATENT DOCUMENTS

2015/0052027 A1\* 2/2015 Pavani ................ G06Q 10/087
　　　　　　　　　　　　　　　　　　　　　705/28
2015/0100427 A1\* 4/2015 Chand ................ G06Q 30/0267
　　　　　　　　　　　　　　　　　　　　　705/14.64

FOREIGN PATENT DOCUMENTS

| KR | 10-2010-0044669 A | 4/2010 |
| KR | 10-2013-0038547 A | 4/2013 |
| KR | 10-1353996 B1 | 1/2014 |

\* cited by examiner

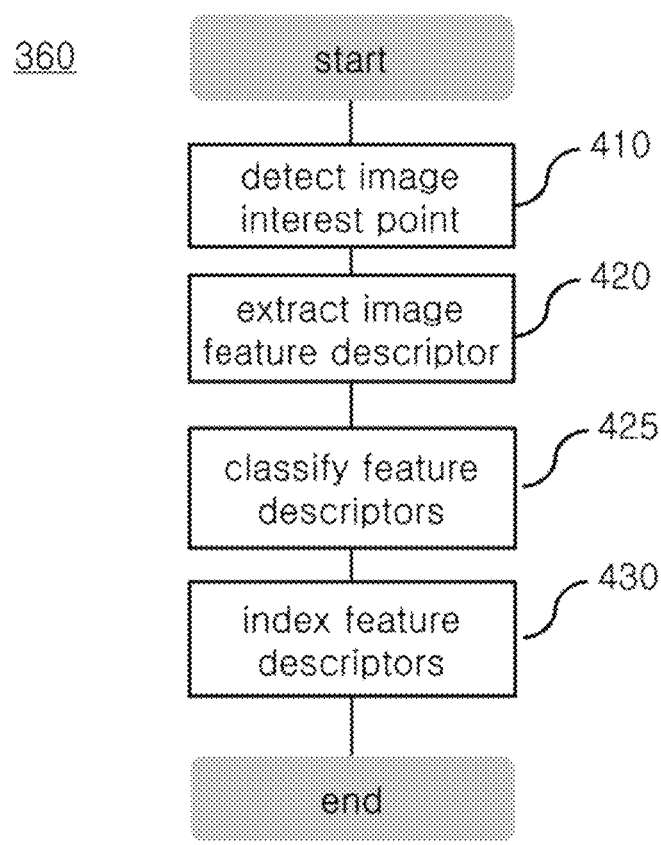

METHOD, APPARATUS, SYSTEM, AND COMPUTER PROGRAM FOR OFFERING AND DISPLAYING PRODUCT INFORMATION

CROSS-REFERENCE TO RELATED APPLICATIONS

The present specification is a by-pass continuation of International Patent Application No. PCT/KR2015/007805 filed Jul. 27, 2015, which claims priority to and the benefit of Korean Patent Application No. 10-2014-0094531 filed in the Korean Intellectual Property Office on Jul. 25, 2014, the entire contents of which are incorporated herein by reference.

TECHNICAL FIELD

The present invention relates to a method and an apparatus for offering and displaying product information corresponding to a displayed image.

More particularly, the present invention relates to a method and an apparatus for offering product information by determining whether an image displayed on a client of a desktop or mobile terminal is identical or similar to a product image in a database.

BACKGROUND ART

In a recent growing wired/wireless Internet environment, online promotions, business transactions or trading are boosted. Once consumers discover any product that the consumers like while searching for magazines, blogs, or YouTube videos on an Internet-connected desktop or mobile terminal, the consumers retrieve a product name to purchase the product. The brand of a bag carried by a famous actress to the airport or the name of a baby product coming on a TV show ranks top on the real-time searching word list of a portal site. However, a user needs to individually open a webpage to search and to retrieve a product name and a store, sometimes having difficulty in finding product information with only an image.

Sellers spend a lot of money not only on commercials but on media sponsorship and the collection of online consumer reviews in order to promote products, since word-of-mouth online advertising functions as an important factor for the sale of products. However, it is frequently not allowed to release product information including a product name and a store despite paying promotional expenses because it is impossible to obtain prior approvals for the display of a product name from individual media viewers, thus bringing about an indirect advertisement issue.

DETAILED DESCRIPTION OF THE INVENTION

Technical Problem

The present invention has been made in order to solve the above mentioned problems. An aspect of the present invention is to provide a method and an apparatus that are capable of retrieving a database of product information only with an image displayed on a client and offering product information in the Internet environment.

Another aspect of the present invention is to provide a method and an apparatus that are capable of efficiently and accurately detecting whether an image displayed on a client is identical or similar to a product image stored in a database of a server.

Technical Solution

In order to address the aforementioned problems, a method for offering product information by a server to a client according to an exemplary embodiment of the present invention includes: generating a database on a plurality of products and extracting feature information on an image included in the database; receiving an image displayed on the client as a query image from the client; determining a matching product matched to feature information on the query image by retrieving feature information on the image in the database; and offering information on the matching product to the client.

Further, a method for displaying product information by a client according to an exemplary embodiment of the present invention includes: transmitting a displayed image as a query image to a server; receiving product information that is identical or similar to the query image from the server; and displaying the product information.

Further, a server for offering product information to a client according to an exemplary embodiment of the present invention includes: a communication unit configured to receive a query image displayed on the client from the client; and a controller configured to generate a database on a plurality of products, to extract feature information on an image included in the database, to determine a matching product matched to feature information on the query image by retrieving feature information on the image in the database, and to offer information on the matching product to the client.

Further, a client for displaying product information according to an exemplary embodiment of the present invention includes: a display configured to display an image; and a controller configured to transmit a displayed image as a query image to a server, to receive product information that is identical or similar to the query image from the server, and to display the product information.

Further, a computer program that is stored in a medium to implement a process of offering product information to a client in a server according to an exemplary embodiment of the present invention includes: a function of generating a database on a plurality of products and extracting feature information on an image included in the database; a function of receiving an image displayed on the client as a query image from the client; a function of determining a matching product matched to feature information on the query image by retrieving feature information on the image in the database; and a function of offering information on the matching product to the client.

Further, a computer program that is stored in a medium to implement a process of displaying product information in a client according to an exemplary embodiment of the present invention includes: a function of transmitting a displayed image as a query image to a server; a function of receiving product information that is identical or similar to the query image from the server; and a function of displaying the product information.

Further, a method for offering product information on an image displayed on a client by a server according to an exemplary embodiment of the present invention includes: generating, by the server, a database on a plurality of products and extracting feature information on an image included in the database; transmitting, by the client, the displayed image as a query image to the server; determining, by the server, a matching product matched to feature information on the query image by retrieving feature information on the image in the database; offering, by the server, information on the matching product to the client; and displaying, by the client, the information on the matching product.

Further, a system for offering product information in which a server offers product information on an image displayed on a client according to an exemplary embodiment of the present invention includes: the server configured to generate a database on a plurality of products, to extract feature information on an image included in the database, to receive a query image displayed on the client from the client, to determine a matching product matched to feature information on the query image by retrieving feature information on the image in the database, and to offer information on the matching product to the client; and the client configured to transmit the query image to the server, to receive the information on the matching product from the server, and to display the product information.

Effects of the Invention

According to the present invention, a server may retrieve a database of product information only with an image displayed on a client and may offer product information. Therefore, convenience in shopping may be improved for purchasers, while advertising effects may be increased for sellers.

In addition, according to the present invention, it is efficiently and accurately detected whether an image displayed on a client is identical or similar to a product image stored in a database of a server. Accordingly, it is not necessary to attach a search tag to an image in advance and is possible to automatically match an image to the product information without reference to the text.

BRIEF DESCRIPTION OF THE DRAWINGS

FIG. 4 is a flowchart illustrating a specific method of generating image feature information in operation 360 of FIG. 3;

MODE FOR CARRYING OUT THE INVENTION

Figure 1:
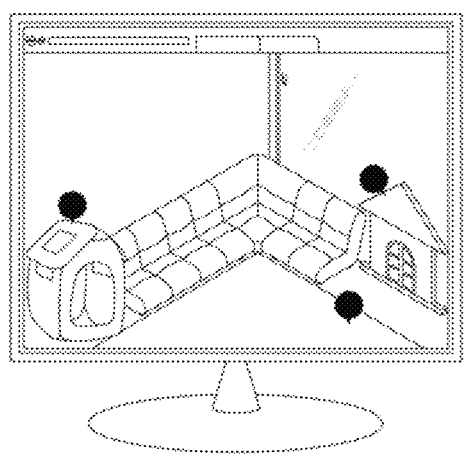
FIG. 1 illustrates an example of displaying an image with product information on a client according to an exemplary embodiment of the present invention.

It is obvious that the present invention is not limited to the embodiments described below and may include various modifications without departing from the technical idea of the present invention. In describing the embodiments, descriptions of technologies which are already known to those skilled in the art and are not directly related to the present invention may be omitted.

Like reference numerals refer to like elements throughout the accompanying drawings. Further, in the drawings, some elements may be exaggerated, omitted, or schematically illustrated, which is to clarify the gist of the present invention by omitting unnecessary descriptions not related to the gist of the present invention. Hereinafter, exemplary embodiments of the present invention will be described in detail with reference to the accompanying drawings.

FIG. 1 illustrates an example of displaying an image with product information on a client according to an exemplary embodiment of the present invention.

A user browsing through a blog on a desktop may wonder about the name or price of a baby product among images displayed on a webpage. In this case, according to the exemplary embodiment of the present invention, as illustrated in FIG. 1, the desktop may offer product information to the user by superposing an icon linked to the product information on a blog webpage.

Furthermore, according to another exemplary embodiment of the present invention, the product information may be provided in the form of a widget of a web browser. For example, the product information may be offered in a toolbar of the web browser or the icon about the product information may be displayed on a menu bar of the web browser.

To this end, an extension program for offering product information may be installed as a plug-in, ActiveX, or toolbar in web browsing tools.

When the user clicks on the icon subsequently, a webpage of an online store of the baby product may be displayed in a new tab of the web browser. For another example, when the user clicks on the icon, a preview page popup may display: the name of the baby product; pictures or drawings including a perspective view, a front view, a rear view, a side view, or a plan view; user age; the usage; manufacturer information; product reviews; the open market price or the lowest price; or information on another recommended product suggested based on the interest in the baby product. Moreover, pages of online stores of similar goods may also be displayed.

A specific method in which the client receives information on a product from a server only with a displayed image will be described below with the accompanying drawings.

Although FIG. 1 illustrates that the icon linked to the product information is displayed, the present invention is not limited thereto. For example, the product information may be displayed as a text, an image, or an action script, each of which may be linked to the product information. Further, instead of displaying a separate icon, when a user selects a random product using an input device, such as a mouse, information on the selected product may be displayed as a popup of a webpage or a preview page.

Figure 2:
FIG. 2 illustrates an example of using a product information retrieval application according to an exemplary embodiment of the present invention.

FIG. 2 illustrates an application to retrieve product information only with an image according to an exemplary embodiment of the present invention.

A user shopping in a hypermarket may wonder about the online lowest price of a displayed telephone. In this case, the user may run a product finder application on a mobile terminal, such as a smartphone or a tablet, may take a picture of the telephone to retrieve, or may import a previously taken picture of the telephone. Here, the application may operate by receiving an input to select a telephone part of a taken image from the user.

When product information on the telephone is received from the server, the mobile terminal may display information on the open market price, the lowest price, or a cheapest online store of the telephone on a separate page. A specific method in which the mobile terminal receives information on a product from the server only with a taken image will be described below with the accompanying drawings.

In the example of FIG. 2, the product information may include the product name of the telephone, other pictures, the usage, manufacturer information, store information, product reviews, the price, another recommended telephone, and information on other office machines including a facsimile machine. A mode in which the application displays the product information or an application running mode may be set up by the user through a setting menu.

For example, a mobile terminal system may be set up to run a product information retrieval application on background, thereby displaying product information on an image displayed on a screen of the mobile terminal without an additional process for running the application.

Figure 3:
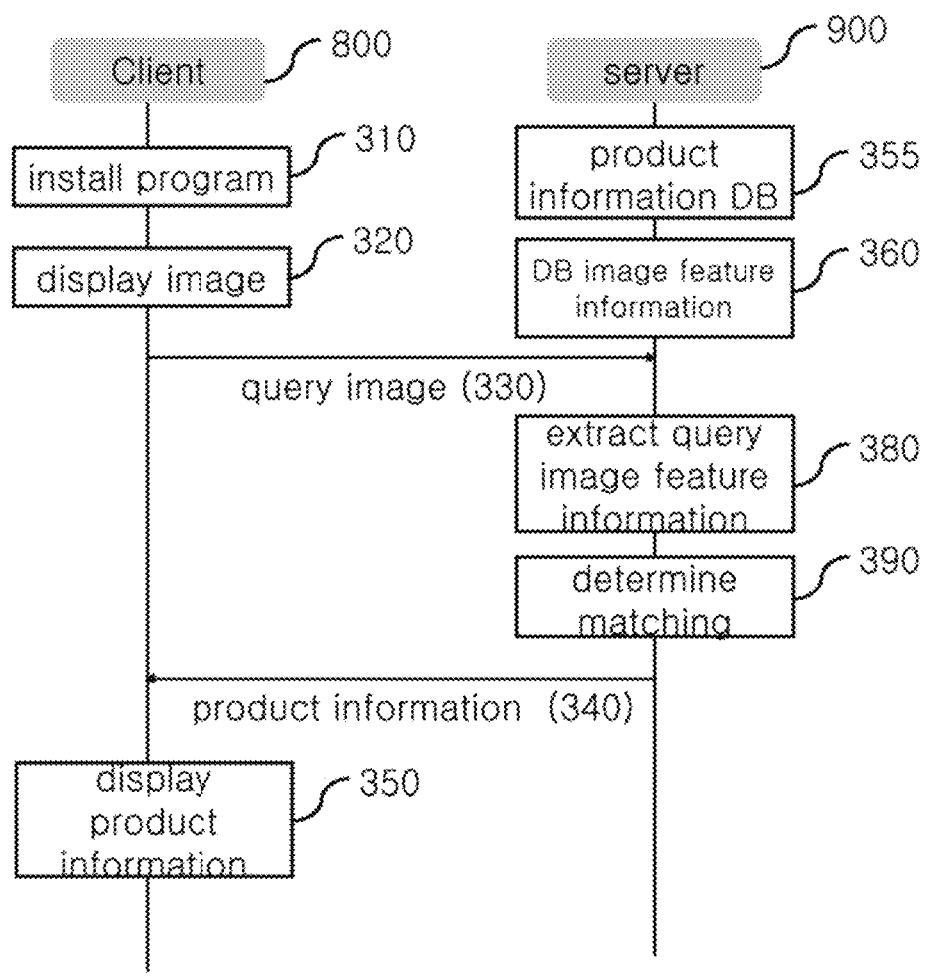
FIG. 3 is a flowchart illustrating a method for offering and displaying product information according to an exemplary embodiment of the present invention.

FIG. 3 is a flowchart illustrating a method for offering and displaying product information according to an exemplary embodiment of the present invention.

In operation 310, a client 800 may run a product information offering program. The program may be an extension program installed as a plug-in or ActiveX in a web browsing tool of a mobile terminal or desktop, or may be an application installed in the mobile terminal.

The program may be downloaded and installed by the client 800 from a server 900 according to the exemplary embodiment of the present invention, and may further be downloaded and installed through a website server of an online market from the server 900.

Particularly, in operation 310, the client 800 may perform a process for user authentication and security with the installation of the program, and may perform a procedure for offering user consent for the receipt of product information to the server 900 or a separate website server.

In operation 320, the client 800 may display an image of a webpage on a display 836, such as a touch screen or a monitor. Although FIG. 3 illustrates operation 320 follows operation 310, the operations may be performed in a different sequence. For example, after the webpage is displayed, the client may receive a user input to run the product information offering application and may perform a subsequent procedure.

In operation 355, the product information offering server 900 may create a product information database. The product information may include a product name, product images with different sizes from different angles, usage, product reviews, manufacturer information, store information, or price information, and may also include a link to similar goods and a recommended product based on a user record log. Methods for collecting the product information from different routes and for designing and storing a database may follow conventional techniques.

In operation 360, the server 900 may generate feature information on product images stored in the database to create a database. More specifically, the server 900 may extract an interest point of a product image, may calculate a feature descriptor, and may index feature information on images for the efficiency in retrieval. Operation 360 is described in detail with reference to FIG. 4 and FIG. 5.

FIG. 4 is a flowchart illustrating operation 360 of generating image feature information in FIG. 3 in detail.

In operation 410, the server 900 may detect interest points of images. An interest point refers to a main area from which a descriptor for a feature of an image, that is, a feature descriptor, is extracted to determine similarities between images.

According to the exemplary embodiment of the present invention, the interest points may be an outline, specifically, a sharp edge or a corner, a blob distinguished from an adjacent region, a region that is invariable or covariant according to an image change, or an extreme point having a feature darker or brighter than ambient brightness.

In operation 420, the server 900 may extract a feature descriptor of an image. A feature descriptor expresses features of an image in a vector value.

According to the exemplary embodiment, the feature descriptor may be calculated using the position of an interest point of the image or the brightness, color, clarity, gradient, scale, or pattern information of the interest point. For example, the feature descriptor may be calculated by converting a brightness value, a brightness variation, or a distribution value of the interest point into a vector.

According to the exemplary embodiment of the present invention, in operation 420, the feature descriptor for the image may be represented not only by the foregoing local descriptor based on the interest point but also by a global descriptor, a frequency descriptor, or a binary descriptor.

More specifically, the feature descriptor may include a global descriptor extracted by converting the brightness, color, clarity, gradient, scale, or pattern information of the entire image, each section of the image divided based on a random criterion, or each interest point into a vector value.

Furthermore, the feature descriptor may include a frequency descriptor, which is extracted by converting, into a vector value, the number of times predetermined feature descriptors are included in the image or the number of times a global feature, such as a conventionally defined color code, is included, and a binary descriptor, which is obtained by extracting in bits whether each descriptor is included or whether each element value forming a descriptor is greater or smaller than a specific value and converting the bits into an integer type.

Although not shown in FIG. 4, prior to operation 420, the server 900 may set the optimized data size of the image feature descriptor in view of a correlation with an error rate in matching in operation 390 and the amount of resources allocated for the extraction of the feature descriptor. This is because the error rate in matching in operation 390 may be reduced with more feature descriptors for the image, while system loads in processes for extracting feature descriptors also need to be considered.

In operation 425, the server 900 may classify the feature descriptors for the image into at least one or more categories according to a preset criterion. Operation 425 is an arbitrary operation, which may be omitted. In this case, the feature descriptors may be used as extracted in operation 420.

According to the exemplary embodiment of the present invention, in operation 425, the server 900 may classify the feature descriptors according to a group created by gathering pieces of feature information extracted from database images or completely different images, dictionary information, or hierarchical structure information in a tree form. Further, the server 900 may classify the feature descriptors according to an address in a low-dimensional subspace generated by decomposing a specific space or in a hash space calculated using given feature information, or classification information learnt by a computer through machine learning or neural network learning. Here, the server 900 may assign or quantize information types of the feature descriptors according to a classification criterion.

In operation 430, the server 900 may index the feature descriptors for the image, which is for quickly and efficiently comparing a database image in the server and a query image from the client using only fewer resources.

According to the exemplary embodiment of the present invention, indexing may be performed by creating a list for categorizing all feature descriptors. For example, in operation 425, the server 900 may create 100 categories, may calculate a category to which all feature descriptors for one image is most related to among the 100 categories, and may determine categories into which respective feature descriptors for all images are classified, thereby indexing a determined result to the database of the images.

Indexing may be performed based on an image as illustrated above but may be performed based on each category, instead of an image. That is, image information to which feature descriptors classified according to each category belong may be inversely indexed to the database based on a category.

Figures 5A, 5B, 5C, 5D:
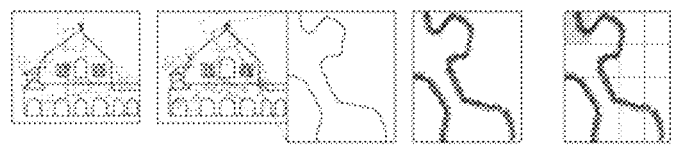
FIG. 5A illustrates an example of selecting an interest point of an image according to an exemplary embodiment of the present invention.
FIG. 5B illustrates an example of converting an interest point of an image according to an exemplary embodiment of the present invention.
FIG. 5C illustrates an example of calculating a feature descriptor for an image according to an exemplary embodiment of the present invention.
FIG. 5D illustrates an example of calculating a feature descriptor for an image according to an additional exemplary embodiment of the present invention.

FIG. 5 illustrates an example of selecting an interest point of an image and calculating a feature descriptor for the image according to an exemplary embodiment of the present invention.

According to the exemplary embodiment of the present invention, an interest point of an image may be selected from an outline included in the image, specifically, a sharp edge or a corner, a blob distinguished from an adjacent region, a region that is invariable or covariant according to an image change, or an extreme point having a feature darker or brighter than ambient brightness. For example, in (a) of FIG. 5, a part including an outline of a cathedral and a part with a brightness variation are extracted as the interest point.

According to the exemplary embodiment of the present invention, a feature descriptor for the image may be calculated using the brightness, color, clarity, gradient, scale, or pattern information of the interest point of the image, each section of the divided interest point, the entire image, or each section of the divided image.

According to the exemplary embodiment of the present invention, to extract information on the interest point as a feature descriptor vector, as illustrated in (b) of FIG. 5, the interest point may be rotated such that a variation in the brightness, color, clarity, gradient, scale, or pattern information of the interest point is nearly constant. Further, as illustrated in (c) of FIG. 5, a variation in each interest point may be extracted as a feature descriptor vector. In addition, as illustrated in (d) of FIG. 5, the interest point is divided according to a random criterion and the brightness, color, clarity, gradient, scale, or pattern information of each divided section may be extracted as a feature descriptor vector.

Referring back to FIG. 3, in operation 330, the client 800 transmits the image displayed on the display as a query image to the server 900, and the server 900 receives the query image. A specific method in which the client transmits the query image to the server through a network may follow conventional techniques.

In operation 380, the server 900 may extract feature information on the query image. A method for the server to generate the feature information on the query image may be the same as the method for detecting an interest point of a database image and extracting a feature descriptor, which is described in FIG. 4.

In operation 390, the server 900 may determine whether the query image is matched to a database image using the feature information on the images. Operation 390 is described in detail with reference to FIG. 6.

Figure 6:
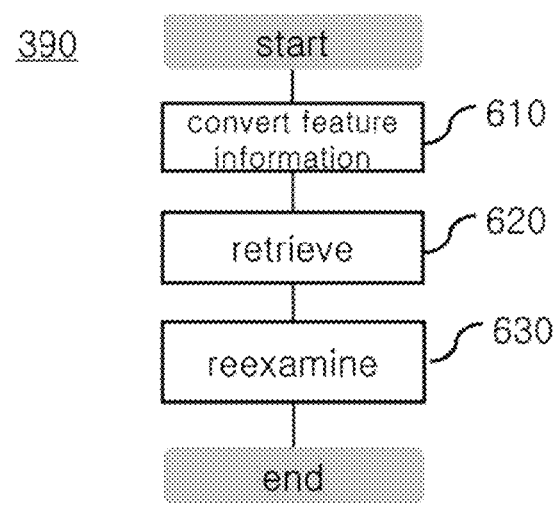
FIG. 6 is a flowchart illustrating a specific method of determining whether a query image is identical or similar to a database image in operation 390 of FIG. 3.

FIG. 6 is a flowchart illustrating operation 390 of FIG. in detail in which the server 900 determines whether the query image is identical or similar to the database image.

In operation 610, the server 900 may convert a feature descriptor for the query image in the same manner as used to index the feature descriptors for the database image in operation 430 of FIG. 4, which is for quickly and efficiently performing a subsequent retrieval process.

In operation 620, the server 900 may retrieve a set of feature descriptors for the database image generated in operation 360 of FIG. 3 to determine whether the query image is identical or similar to the database image.

For example, when the server 900 inversely indexes image information in each category to the database based on all categories in operation 430 of FIG. 4, the server 900 may perform retrieval by selecting an image indicated most by feature descriptors for the query image in the operation 620 of FIG. 6.

This retrieval may allow the server to determine whether the distance between a feature descriptor vector value of the database image and a feature descriptor vector value of the query image is within a preset threshold.

In operation 630, the server 900 may reexamine a retrieval result. Reexamination may determine the degree of consistency (geometric consistency) between the query image and the database image using attributes of the feature information, such as positional information, scale, rotation degree, and distribution information on the interest point or feature descriptor for the image. When the degree of consistency is higher than a preset threshold, the query image passes through reexamination.

Operation 630 may be omitted depending on system purposes.

Referring back to FIG. 3, when there is a database image matched to the query image, the server 900 may offer product information on the matched database image to the client 800 and the client 800 may receive the product information in operation 340.

In the exemplary embodiment of the present invention, the product information may include a product name, pictures with different scales from different angles from the query image, usage, manufacturer information, store information, product reviews, or price information, and may include URL information to offer the product information, information on similar goods to a matched product, or information on a recommended product derived based on a user record log.

In operation 350, the client 800 may display the product information received from the server. More specifically, in the exemplary embodiment of the present invention, the client may offer the product information to the user by displaying an icon linked to the product information on the display. When the user clicks on the icon subsequently, a preview page popup may display a webpage of an online store of a corresponding product or specification of the product. Further, pages of online stores of similar goods may also be displayed.

According to the exemplary embodiment of the present invention, the product information may be displayed as a link destination in a text, an image, or an action script. Further, instead of displaying a link destination, when a user selects a random product using an input device, such as a mouse, information on the selected product may be displayed as a popup of a webpage or a preview page.

Figure 7:
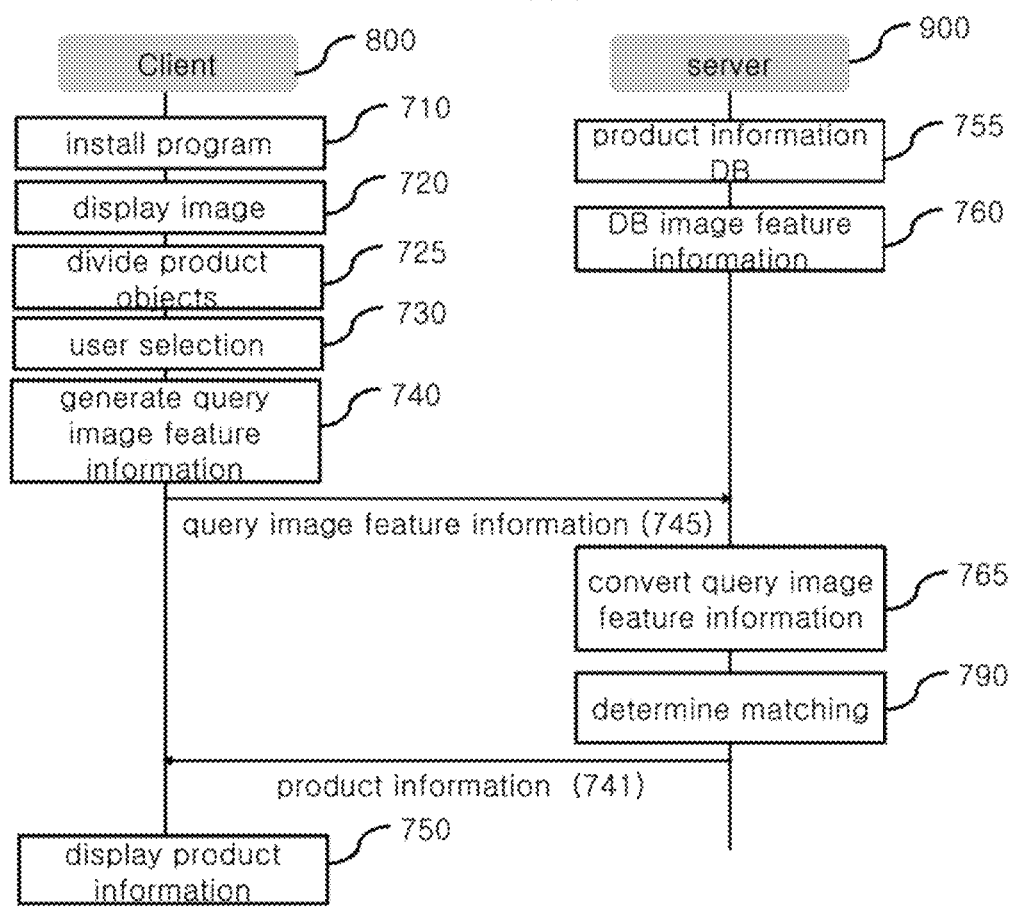
FIG. 7 is a flowchart illustrating a method for offering and displaying product information according to another exemplary embodiment of the present invention.

FIG. 7 illustrates an example of displaying product information on a client according to another exemplary embodiment of the present invention.

Particularly, the embodiment in FIG. 7 relates to a method in which the client is in charge of generating feature information on a query image to reduce the amount of data transferred via a network, thereby improving the speed of the entire system.

Since operations 710, 720, 755, and 760 in FIG. 7 are substantially the same as operations 310, 320, 355 and 360 in FIG. 3, the following description is made on differences with reference to FIG. 7.

In operation 725, the client 800 may divide objects included in a displayed image. For example, the client 800 may divide the objects into a background, a person, a coffee can, and a lotion using an outline of the displayed image.

In operation 730, the client 800 may receive a user input to select a divided product object. Here, the client 800 may create a setting to allow only an object that can be sold or purchased, such as a product, to be selected, not allowing an object, such as a background and person, to be selected, in view of purposes of the present invention.

In operation 740, the client 800 may generate feature information on a user-selected product image as a query image. More specifically, the client may detect an interest point of an object in the image selected by the user and may extract a feature descriptor, which has been described in detail in operations 410 and 420 of FIG. 4. The number of interest points of the query image and the number of feature descriptors may be set up differently by each client in view of process performance.

In operation 745, the client 800 may transmit the generated feature information on the query image to the server.

Unlike in the exemplary embodiment in FIG. 3, according to the exemplary embodiment in FIG. 7, only feature information on a product object image selected by the user may be transferred through the network, instead of the entire image displayed on the client. Therefore, the amount of data transferred via the network may be remarkably reduced and upload and download times may be decreased, thereby improving the speed of the entire system.

In operation 765, the server 900 may convert the received feature information on the query image according to the same criterion as used for classifying the feature information on the database images in operation 760.

Operations 790 and 740 are substantially the same as operations 390 and 340. In operation 750, the client may display product information. In the exemplary embodiment in FIG. 7, the client may display only the product information, instead of displaying the query image and the product information together.

Figure 8:
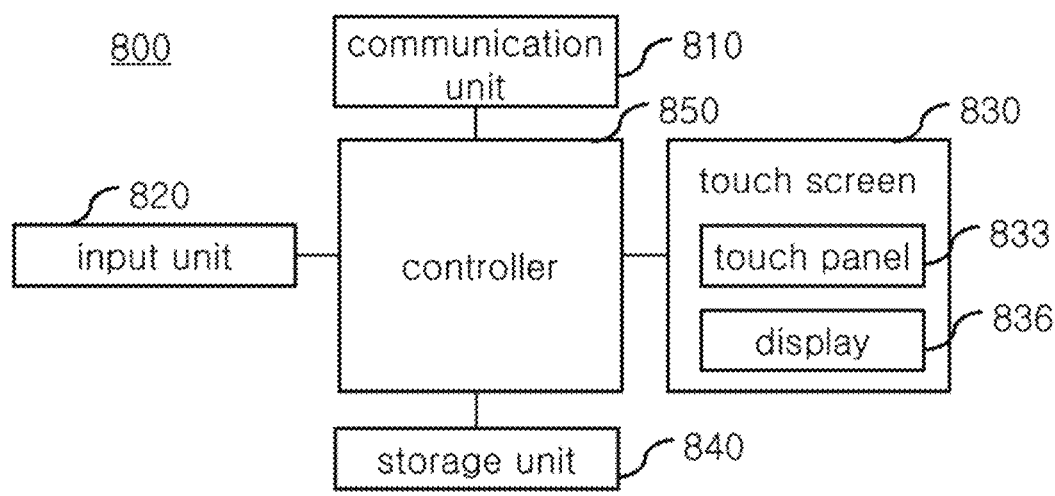
FIG. 8 is a block diagram illustrating a configuration of a client that displays product information according to an exemplary embodiment of the present invention.

FIG. 8 is a block diagram illustrating a configuration of the client 800 according to an exemplary embodiment of the present invention. In the present specification, mobile terminals, such as a smartphone, a tablet, and a PDA, are illustrated, but the present invention is not limited thereto. In the exemplary embodiment of the present invention, the client may be a personal computer or a notebook.

As illustrated in FIG. 8, the client 800 according to the exemplary embodiment of the present invention may include a communication unit 810, a touch screen 830, an input unit 820, a storage unit 840, and a controller 460. Although not shown in FIG. 8, the client 800 may further include an audio processor and a video processor.

The communication unit 810 may perform a data transmission and reception function for wired and wireless communications of the client 800, may function to receive data through wired and wireless channels to output the data to the controller 850, and may function to transmit data output from the controller 850 via wireless and wired channels.

The touch screen 830 includes a touch panel 833 and the display 836. Specifically, the touch panel 833 according to the exemplary embodiment of the present invention may receive a user input to select a product object from an image displayed on the display 836, and the display 836 may function to display product information.

The input unit 820 may receive a user input to control the client 800 and may generate an input signal to transmit the input signal to the controller 850. In a preferred exemplary embodiment of the present invention, the client 800 may be entirely manipulated using only the touch screen 830. In this case, the touch panel 833 may function as the input unit 820.

The storage unit 840 may serve to store a program and data needed for operations of the client 800 and may be divided into a program region and a data region. The data region of the storage unit 840 according to the exemplary embodiment of the present invention may store a query image or feature information on the query image. Further, the program region of the storage unit 840 according to the exemplary embodiment of the present invention may store an application to implement a process of displaying product information on the client. The application may perform a function of transmitting an image displayed on the display 836 as a query image to the server, a function of receiving information on products identical or similar to the query image from the server, and a function of displaying the product information.

The controller 850 controls overall operations of the components of the client. In particular, the controller 850 of the client according to the exemplary embodiment of the present invention may transmit an image displayed on the display 836 as a query image to the server, may control the communication unit 810 to receive information on products identical or similar to the query image from the server, and may control the display 836 to display the product information.

Figure 9:
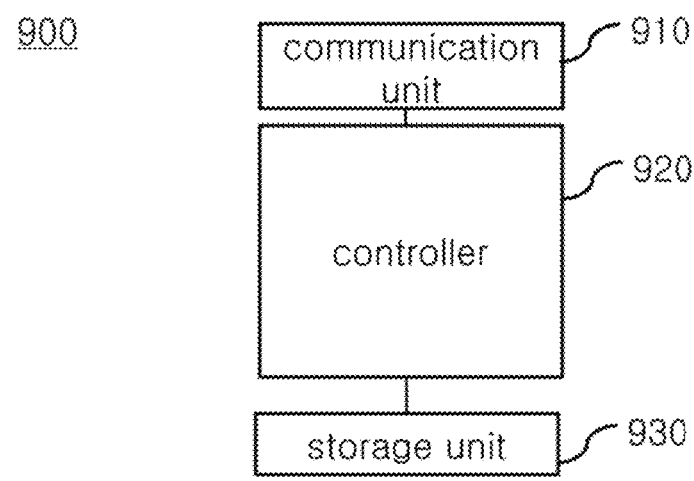
FIG. 9 is a block diagram illustrating a configuration of a server that offers product information according to an exemplary embodiment of the present invention.

FIG. 9 is a block diagram illustrating a configuration of the server 900 according to an exemplary embodiment of the present invention. As illustrated in FIG. 9, the server 900 according to the exemplary embodiment of the present invention may include a communication unit 910, a storage unit 930, and a controller 920. Although not shown in FIG. 9, the server 900 may further include an input unit and a display. Although FIG. 9 shows that the server 900 includes the communication unit 910, the storage unit 930, and the controller 920, the blocks may be physically separated. For example, the storage unit 930 may be physically located in an online sale system (not shown) and may be connected to the controller 920 of the server 900 through the communication unit 910.

The communication unit 910 may perform a data transmission and reception function for wired and wireless communications of the server 900, may serve to receive data through wired and wireless channels to output the data to the controller 920, and may serve to transmit data output from the controller 920 via wireless and wired channels. In particular, the communication unit 910 according to the exemplary embodiment of the present invention may function to receive a query image from a client.

The storage unit 930 may serve to store a program and data needed for operations of the server 900 and may be divided into a program region and a data region. The data region of the storage unit 930 according to the exemplary embodiment of the present invention may store a product information database, database image feature information, and query image feature information.

Further, the program region of the storage unit 940 according to the exemplary embodiment of the present invention may store a computer program to implement a process of offering product information to the client on the server. The computer program may function to: generate a database on a plurality of products; extract feature information on an image included in the database; receive an image displayed on the client as a query image from the client; retrieve the feature information on the image in the database to determine a matching product matched to feature information on the query image; and offer information on the matching product to the client.

The controller 920 controls overall operations of the components of the server 900. In particular, the controller 920 according to the exemplary embodiment of the present invention may serve to: generate a database on a plurality of products; extract feature information on an image included in the database; and retrieve the feature information on the image in the database to determine a matching product matched to feature information on the query image, and may control the communication unit 910 to offer information on the matching product to the client.

Although the foregoing description has focused only on a product available online in the present specification, the present invention may be extended, without being limited thereto. Since the present invention makes it possible to efficiently and accurately detect whether images are identical or similar, the server may offer art object information, real estate information, film screening information, tour information, or the like corresponding to an image.

For example, when the user runs the product finder application of the exemplary embodiment of the present invention to import a picture of a displayed art object, a house placed on sale, a movie poster, a wine label, or a tourist attraction, the server may offer a description on an art object matched to the picture to the client.

In addition, although the foregoing description has focused on a method of detecting whether images are identical or similar in the present specification, the present invention may be extended to a video, without being limited thereto. The detection method according to the exemplary embodiment of the present invention may be applied to each screen frame forming a video and may also be applied to a set of frames divided according to a preset criterion or the entire video.

For example, when the user runs the product finder program according to the exemplary embodiment of the present invention while watching a video on a tablet, the user may select a product object included in an image to receive information on the product.

The embodiments of the present invention disclosed herein and shown in the drawings are merely specific examples presented in order to easily describe technical details of the present invention and to help the understanding of the present invention, and are not intended to limit the scope of the present invention. It will be apparent to those having ordinary knowledge in the technical field, to which the present invention pertains, that it is possible to practice other modified embodiments based on the technical idea of the present invention as well as the embodiments disclosed herein.

The invention claimed is:

1. A method for offering product information by a server to a client, the method comprising:
generating a database on a plurality of products and extracting feature information on an image included in the database;
receiving an image displayed on the client as a query image from the client;
determining a matching product matched to feature information on the query image by retrieving the feature information on the image in the database; and
offering information on the matching product to the client,
wherein the determining of the matching product comprises:
indexing the feature information on the image in the database by classifying the feature information on the image in the database into one or more categories according to a preset criterion;
extracting the feature information on the query image; and
determining whether the query image is matched to the image in the database using the feature information on the query image and indexing information on the image in the database,
wherein the method further comprises:
determining a product corresponding to an image in the database matched to the query image as the matching product; and
reexamining accuracy of a matching result,
wherein the reexamining comprises:
determining a degree of consistency between images of the matching product in the database and the query image using attributes for position, scale, and rotation degree of interest points included in feature information on the images in the database and the feature information on the query image; and
determining whether the degree of consistency is higher than a preset threshold.

2. The method of claim 1, wherein the receiving of the query image comprises receiving the feature information on the query image from the client.

3. The method of claim 1, wherein the extracting of the feature information on the image in the database further comprises:
selecting an interest point of the image in the database; and
calculating feature descriptors for the image in the database.

4. The method of claim 3, wherein the selecting of the interest point of the image in the database comprises selecting the interest point of the image in the database using at least one of an outline comprised in the image in the database, a corner, a blob distinguished from an adjacent region, a region that is invariable or covariant according to an image change, and an extreme point having a feature darker or brighter than a surrounding part.

5. The method of claim 3, wherein the calculating of the feature descriptors for the image in the database comprises calculating the feature descriptors for the image in the database using at least one of brightness, color, clarity, gradient, scale, and pattern information of the interest point of the image in the database.

6. The method of claim 5, further comprising calculating the feature descriptors for the image in the database are calculated using at least one of brightness, color, clarity, gradient, scale, and pattern information of the image in the database or each section of the image in the database that is divided according to a preset criterion.

7. The method of claim 3, wherein the indexing of the feature information on the image in the database comprises:
classifying the feature descriptors for the image in the database according to the preset criterion; and
indexing classification information on the feature descriptors.

8. The method of claim 7, wherein the classifying comprises classifying the feature descriptors for the image in the database into the one or more categories according to the preset criterion.

9. The method of claim 7, wherein the indexing is comprises indexing the feature information on the image in the database classified according to the preset criterion based on the image in the database or indexing the image in the database corresponding to each category based on the one or more categories.

10. The method of claim 1, wherein the information on the matching product comprises link information on a store of a product corresponding to an image in the database that is identical or similar to the query image.

* * * * *